US006586485B1

(12) United States Patent
Bruchmann et al.

(10) Patent No.: US 6,586,485 B1
(45) Date of Patent: *Jul. 1, 2003

(54) PRODUCTION OF FLEXIBLE POLYURETHANE FOAMS

(75) Inventors: Bernd Bruchmann, Freinsheim (DE); Heinz-Dieter Lutter, Neckargemünd (DE)

(73) Assignee: BASF Aktiengesellschaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/166,995

(22) Filed: Oct. 6, 1998

(30) Foreign Application Priority Data

Oct. 10, 1997 (DE) .......................... 197 44 747

(51) Int. Cl.$^7$ ................................ C08G 18/14
(52) U.S. Cl. .................. 521/99; 521/113; 521/117; 521/118; 521/128; 521/129; 521/130; 521/155; 521/170; 521/172; 521/174
(58) Field of Search ................. 521/117, 155, 521/172, 174, 170, 99, 113, 118, 128, 129, 130

(56) References Cited

U.S. PATENT DOCUMENTS

| 4,002,601 A | | 1/1977 | Hajek et al. | |
| 4,383,051 A | * | 5/1983 | Meyborg et al. | 521/174 |
| 4,500,656 A | * | 2/1985 | Rasshofer et al. | 521/164 |
| 4,608,399 A | * | 8/1986 | Buysch et al. | 521/107 |
| 4,795,796 A | | 1/1989 | Haubennestel et al. | |
| 5,112,879 A | | 5/1992 | Randall et al. | |
| 5,346,928 A | * | 9/1994 | De Vos et al. | 521/117 |
| 5,578,653 A | * | 11/1996 | Hendreich et al. | 521/114 |
| 5,578,656 A | * | 11/1996 | Gillis et al. | 521/170 |
| 5,591,779 A | * | 1/1997 | Bleys et al. | 521/174 |
| 5,631,319 A | | 5/1997 | Reese et al. | |
| 5,688,891 A | | 11/1997 | Hovestadt et al. | |

FOREIGN PATENT DOCUMENTS

| DE | A-2245636 | | 3/1974 |
| DE | B-2446438 | | 4/1976 |
| DE | A-4432647 | | 3/1996 |
| EP | 0498628 a1 | * | 4/1992 |
| EP | 716110 A1 | | 6/1996 |
| GB | 1390719 | | 4/1975 |

OTHER PUBLICATIONS

EPO Search Report Dated Jan. 27, 1999; Translation of Same EPO Search Report.
E.D. Bergmann, Chem.Rev. 53(1953), 309–352 "The Oxazolidines."

* cited by examiner

*Primary Examiner*—John M. Cooney, Jr.
(74) *Attorney, Agent, or Firm*—Fernando A. Borrego

(57) ABSTRACT

In a process for producing flexible polyurethane foams by the reaction known per se of polyisocyanates with compounds containing at least two hydrogen atoms which react with isocyanate, the reaction is carried out in the presence of cyclic or heterocyclic compounds containing at least one reactive hydrogen atom.

15 Claims, No Drawings

PRODUCTION OF FLEXIBLE POLYURETHANE FOAMS

The present invention relates to a process for producing flexible polyurethane foams having very good elastic, in particular viscoelastic, properties.

The production of flexible polyurethane foams by reacting polyisocyanates and compounds containing at least two active hydrogen atoms, frequently also described as the polyol component, has been known for a long time and has been described many times in the literature.

Recently, automobile construction has been demanding flexible polyurethane foams which have to display excellent absorption properties for structure-borne sound, air-borne sound and energy. Such foams are used for insulating and damping elements.

In the orthopedic sector too, foams having a similar property profile are demanded for seat cushions and mattresses. In the case of conventional flexible foams, the elasticity results in point loading when sitting and lying, which is the cause of soreness from sitting and lying. Viscoelastic foams counteract point loading because the foam matches the body contours.

A significant parameter in determining the viscoelastic properties is the loss factor which represents an index for the absorption of energy, for example structure-borne sound, in a standardized volume element.

Targeted matching of the loss factor to the particular application is very complicated to carry out.

It is an object of the present invention to develop flexible polyurethane foams in which the loss factor can be adjusted in a targeted manner while the other parameters remain largely constant.

We have found that this object is achieved by adding to the polyol components small amounts, preferably from 2 to 10% by weight, based on the weight of the polyol component, of cyclic or heterocyclic compounds containing at least one active hydrogen atom, in particular cyclic acetals and/or ketals.

The present invention accordingly provides a process for producing viscoelastic flexible polyurethane foams by reacting polyisocyanates with compounds containing at least two reactive hydrogen atoms, wherein the compounds containing at least two reactive hydrogen atoms contain small amounts, preferably from 2 to 10% by weight, based on the weight of the compounds containing at least two active hydrogen atoms, of cyclic or heterocyclic compounds containing at least one active hydrogen atom, in particular cyclic acetals and/or ketals.

The cyclic monofunctional compounds according to the present invention are, for example
- cycloaliphatic alcohols such as cyclopentanol, cyclohexanol, cycloheptanol, cyclooctanol, cyclopentanemethanol, cyclohexanemethanol or menthol,
- aromatic alcohols such as benzyl alcohol or 4-tert-butylbenzyl alcohol,
- alkoxylated phenols such as hydroxyethyl phenyl ether,
- cycloaliphatic amines such as N-methylcyclohexylamine Monofunctional heterocyclic compounds are, for example
- OH-functional imidazoles such as N-(2-hydroxyethyl) imidazole,
- OH-functional oxazolidines such as N-(2-hydroxyethyl)-2-isopropyl-1,3-oxazolidine,
- OH-functional morpholines such as N-(2-hydroxyethyl) morpholine,
- OH-functional piperidines such as N-(2-hydroxyethyl) piperidine or 4-hydroxy-1-methylpiperidine,
- NH-functional compounds such as morpholine, piperidine or N-(3-aminopropyl)imidazole, preferably
- OH-functional pyrrolidinones such as N-(2-hydroxyethyl)-2-pyrrolidinone,
- OH-functional cyclic carbonates such as glycerol carbonate or trimethylolpropane (TMP) carbonate,
- OH-functional cyclic acetals such as 5-ethyl-5-hydroxymethyl-1,3-dioxane (TMP formal),
- OH-functional cyclic ketals such as 2,2-dimethyl-5-ethyl-5-hydroxymethyl-1,3-dioxane (isopropylidene-TMP) or 2,2-dimethyl-4-hydroxymethyl-1,3-dioxolane (isopropylidene-glycerol).

These cyclic or heterocyclic compounds together with their functional groups are built into the polyurethane matrix. They exercise a significant influence on the loss factor without significantly influencing the remaining foam properties.

The monofunctional cyclic acetals or ketals used according to the present invention are prepared, in particular, by reacting triols with aldehydes or ketones. Triols used are those having at least two adjacent hydroxyl groups. Preference is given to using glycerol and trimethylolpropane (TMP). Aldehydes and ketones used are, in particular, those having from 1 to 12 carbon atoms, preferably formaldehyde, acetaldehyde, propionaldehyde, butyraldehyde or isobutyraldehyde, also acetone, 2-butanone (MEK) or cyclopentanone and cyclohexanone. The reaction of the aldehydes and ketones with the alcohols is carried out, for example, in solution using acid catalysts; the water formed should be removed from the reaction mixture.

Oxazolidines are prepared in a similar manner to the abovementioned acetals or ketals by reacting, for example, diethanolamine with aldehydes or ketones, likewise removing the resulting water of reaction. On this subject, see also E. D. Bergmann, Chem. Rev. 53 (1953), 309–352, DE-A 2 245636, DE-C 2 446 438 and U.S. Pat. No. 3,037,006.

The cyclic carbonates can be prepared from polyfunctional alcohols, for example as described in DE-A-44 32 647.

It is possible and for many applications advantageous to add chains onto the free hydroxyl group of the monofunctional cyclic or heterocyclic compounds. A condition here is, however, that the chain also contains a free hydroxyl group.

Particular preference is given to the molecular addition of polyether chains by reacting the monofunctional cyclic compounds with alkylene oxides, in particular ethylene oxide and/or propylene oxide. The reaction can be carried out by the generally known reaction mechanism of base-catalyzed alkylene oxide addition using basic catalysts, in particular alkali metal hydroxide catalysts. Preference is given to adding up to 10, in particular up to 5, alkylene oxide molecules onto the free hydroxyl group.

The monofunctional cyclic and heterocyclic compounds used according to the invention can be employed for producing all viscoelastic flexible polyurethane foams, in particular flexible block foams and flexible molded foams, both those based on diphenylmethane diisocyanate (MDI) and those based on tolylene diisocyanate (TDI). In TDI flexible block foams having a low density (<25 g/l), these compounds additionally act as plasticizers.

The monofunctional cyclic and heterocyclic compounds used according to the present invention are readily compatible with the other polyurethane formative components. To produce foams, it is advantageous to add the compound used according to the present invention to the polyol component.

The latter is the mixture of polyols, possibly chain extenders and/or crosslinkers, catalysts, blowing agents and auxiliaries and/or additives. The addition of the cyclic compounds usually results in a significant lowering of the viscosity and thus to advantages in the processing of the polyurethane system.

As regards the remaining starting materials for the process of the present invention, the following may be said:

Isocyanates used are the known (cyclo)aliphatic and in particular aromatic polyisocyanates. For producing flexible polyurethane foams, particular preference is given to tolylene 2,4- and 2,6-diisocyanate (TDI), usually as a mixture of the two isomers, and also diphenylmethane 4,4'-diisocyanate (MDI), if desired as a mixture with other isomers or with polyphenylpolymethylene polyisocyanates (polymeric MDI). In place of the pure isocyanates, use is frequently made of modified isocyanates. Such modified isocyanates can result, for example, from formation of urethanes, allophanates, carbodiimides, isocyanurates, ureas and biurets, but in particular by reacting the isocyanates with a deficiency of H-functional compounds to give prepolymers.

Compounds containing at least two reactive hydrogen atoms which are used in the process of the present invention are, in particular, polyester polyols and polyether polyols.

The polyether polyols used usually have a functionality of from 2 to 4, preferably from 2 to 3, and a molecular weight of from 2200 to 8000 g/mol, preferably from 3600 to 6500 g/mol. They are usually prepared by base-catalyzed, usually alkali metal hydroxide-catalyzed, addition of lower alkylene oxides, usually ethylene oxide and/or propylene oxide, onto hydroxyl-functional initiator substances. Initiator substances used are usually water and/or 2- or 3-functional alcohols such as ethylene glycol, propylene glycol, glycerol or trimethylolpropane (TMP). Alkylene oxides used are, as mentioned, usually ethylene oxide and/or propylene oxide. These can be added on individually, in succession or in admixture with one another. In the case of flexible foam polyetherols, an ethylene oxide block is frequently added on the ends of the chain to increase the proportion of primary hydroxyl groups.

The polyester polyols used are prepared by condensation of at least bifunctional carboxylic acids with at least bifunctional alcohols. In the process of the present invention, use is made, in particular, of those having an average functionality of from 2.0 to 3.5, preferably from 2.0 to 2.8, and an average molecular weight of from 800 to 4000 g/mol, in particular from 1500 to 2800 g/mol.

The compounds containing at least 2 isocyanate-reactive groups also include chain extenders and crosslinkers. These are preferably H-functional compounds having molecular weights of from 62 to 400 g/mol, in particular 2- to 3-functional alcohols, amines or aminoalcohols. Their amount is, in particular, from 0 to 25 parts by weight, preferably from 4 to 10 parts by weight, based on 100 parts by weight of polyether polyol and/or polyester polyol.

In addition, the polyurethane systems of the present invention further comprise blowing agents, catalysts and auxiliaries and/or additives.

Catalysts used are preferably the customary and known polyurethane catalysts. These are, for example, tertiary amines such as triethylenediamine, metal salts such as tin compounds, and also mixtures of these.

As blowing agent, use is made, in particular, of water which reacts with isocyanate groups to form carbon dioxide. The amount of water here is advantageously from 0.1 to 8 parts by weight, in particular from 2 to 3 parts by weight, based on 100 parts by weight of the compounds containing at least two groups which react with isocyanate.

In admixture with water, it is also possible to use physically active blowing agents. These are preferably liquids which are inert toward the polyurethane formative components and have boiling points below 100° C., preferably below 50° C., in particular in the range from −50 to 30° C., so that they vaporize under the action of the exothermic polyaddition reaction. Examples of such liquids are hydrocarbons such as n-pentane, isopentane and/or cyclopentane, ethers, ketones, halogenated hydrocarbons, as long as they have no ozone depletion potential, or noble gases. The amount of these physically active blowing agents is usually from 0 to 30 parts by weight, preferably from 0 to 20 parts by weight, based on 100 parts by weight of the compound containing at least 2 hydrogen atoms which react with isocyanate.

Auxiliaries and/or additives used are, for example, flame retardants, surface-active substances, stabilizers, cell regulators, fungistatic and bacteriostatic substances, dyes, pigments and fillers. These materials are added to the foam system when required, in order to give it particular properties.

More detailed information regarding the components used may be found, for example, in the Kunststoff-Handbuch, Volume VII Polyurethane, Carl-Hanser-Verlag, Munich, Vienna, 1st to 3rd Edition, 1966, 1983 and 1993.

To produce the flexible polyurethane foams of the present invention, the starting compounds are reacted at from 0 to 100° C., preferably from 15 to 80° C., in such ratios that from 0.5 to 2, preferably from 0.8 to 1.3 and in particular about 1, reactive hydrogen atom(s) is/are present per NCO group and, if water is used as blowing agent, the molar ratio of equivalents of water to equivalents of NCO group is 0.5–5:1, preferably 0.7–0.95:1.

The flexible polyurethane foams of the present invention are advantageously produced by the one-shot process by mixing a polyol component and an isocyanate component. The polyol component comprises the compounds containing at least two hydrogen atoms which react with isocyanate, at least one cyclic or heterocyclic compound containing a reactive hydrogen atom and also, if desired, catalysts, blowing agents and auxiliaries and/or additives and the isocyanate component comprises the polyisocyanate and also, if desired, catalysts, blowing agents and auxiliaries and/or additives. The two components are intensively mixed and can be foamed in open or closed molds.

The flexible polyurethane foams of the present invention are used, in particular, for insulating and damping elements, in particular in vehicle construction, or for upholstered, sitting or lying furniture. They have excellent viscoelastic properties as can be seen from the high loss factor and the low elasticity.

The polyurethane systems of the present invention have a relatively long setting time and rise time, which indicates good flowability of the liquid system. It is thus also possible to fill complex and complicated mold geometries, as are customary in parts for vehicle construction, with the polyurethane system without problems, thus reducing the reject rate. Since the cyclic compounds used according to the present invention are incorporated quantitatively into the foam structure, the foams produced according to the present invention display very low fogging. In addition, the shrinkage of these foams is very small.

The invention is illustrated by the following examples.
Starting materials used:
Polyols Polyol A: a glycerol-initiated polyoxypropylene-polyoxyethylenetriol having 14% of polyoxethylene groups (terminal), OH number=28 mgKOH/g
Polyol B: a glycerol-initiated polyoxypropylene-polyoxyethylenetriol having an OH number of 42 mgKOH/g and a polyoxyethylene proportion of 75%
Polyol C: an ethylenediamine-initiated polyoxypropylene polyol having an OH number of 480 mgKOH/g
Polyol D: a glycerol-initiated polyoxypropylene-polyoxyethylenetriol having an ethylene oxide proportion of 10% and an OH number of 56 mgKOH/g
Polyisocyanate: Isocyanate prepolymer consisting of 74.7% of Lupranat® MI (mixture of 4,4'- and 2,4'-MDI), 12.4% of LUPRANAT® M20W (polymeric MDI) and 12.9% of polyol D The NCO content is 28.4% by weight Catalyst 1: 33% strength solution of diazabicyclooctane in dipropylene glycol
Catalyst 2: Bis(N,N-dimethylaminoethyl)ether, 70% strength in dipropylene glycol
Stabilizer 1: Silicon stabilizer Tegostab® B8701 from Goldschmidt, Essen.
Stabilizer 2: Silicon stabilizer Tegostab® B8418 from Goldschmidt, Essen EXAMPLES 1 to 6

Use of isopropylideneglycerol in a highly elastic flexible MDI block foam

The polyurethane systems shown in the table were reacted. The reaction was carried out in a mold which was open at the top and had dimensions of 40×40 cm. The isocyanate component used was the above-described polyisocyanate. The properties of the foams obtained are likewise shown in Table 1. For curing, the flexible foam obtained was stored overnight.

TABLE 1

|  |  | Example | | | | | |
| --- | --- | --- | --- | --- | --- | --- | --- |
|  |  | 1 (C) | 2 | 3 | 4 | 5 | 6 |
| Polyol A | Parts | 100 | 100 | 100 | 100 | 100 | 100 |
| Catalyst 2 | Parts | 0.22 | 0.22 | 0.22 | 0.22 | 0.22 | 0.22 |
| Dibutyltin dilaurate | Parts | 0.06 | 0.06 | 0.06 | 0.06 | 0.06 | 0.06 |
| Stabilizer 1 | Parts | 0.10 | 0.10 | 0.10 | 0.10 | 0.10 | 0.10 |
| Water | Parts | 2.18 | 2.18 | 2.18 | 2.18 | 2.18 | 2.18 |
| Isopropylideneglycerol | Parts | — | 2.00 | 4.00 | 6.00 | 8.00 | 10.00 |
| Mixing ratio, 100 parts of polyol; parts of isocyanate |  | 44.1 | 46.3 | 48.6 | 50.9 | 53.2 | 55.4 |
| Cream time | [sec.] | 15 | 12 | 14 | 15 | 15 | 17 |
| Fiber time | [sec.] | 80 | 80 | 80 | 85 | 92 | 92 |
| Rise time | [sec.] | 160 | 140 | 176 | 210 | 210 | 225 |
| Density DIN 53 420 | [g/l] | 51.7 | 51 | 49.6 | 51 | 47.5 | 48.9 |
| Elasticity ASTM D-3574-86 | [%] | 60 | 55 | 45 | 40 | 35 | 30 |
| Tensile strength DIN 53 571 | [kPa] | 84 | 110 | 108 | 83 | 51 | 40 |
| Elongation DIN 53 571 | [%] | 194 | 242 | 330 | 337 | 245 | 161 |
| Compressive set DIN 53 572 | [%] | 5 | 7 | 17 | 29 | 34 | 41 |
| Indentation resistance B (40%) DIN 53 576 | [N] | 175 | 171 | 140 | 121 | 94 | 94 |
| Fogging DIN 75 201 | [mg] | 0.10 | 0.05 | 0.16 | 0.12 | 0.13 | 0.26 |
| Loss factor [1)] DIN 53 426 |  | 0.13 | 0.14 | 0.21 | 0.23 | 0.27 | 0.28 |

Index: in all cases 100
[1)]Measured by the vibrometer method
Parts are by weight
C = Comparative experiment Examples 7 to 11 (Comparison)

The procedure of Examples 1 to 6 was repeated, but 1-butanol was used as monofunctional compound in place of isopropylideneglycerol. The exact amounts used and the properties determined on the foams are shown in Table 2.

TABLE 2

|  |  | 7 (C) | 8 (C) | 9 (C) | 10 (C) | 11 (C) |
| --- | --- | --- | --- | --- | --- | --- |
| Polyol A | Parts | 100 | 100 | 100 | 100 | 100 |
| Catalyst 2 | Parts | 0.22 | 0.22 | 0.22 | 0.22 | 0.22 |
| Dibutyltin dilaurate | Parts | 0.06 | 0.06 | 0.06 | 0.06 | 0.06 |
| Stabilizer 1 | Parts | 0.10 | 0.10 | 0.10 | 0.10 | 0.10 |
| Water | Parts | 2.18 | 2.18 | 2.18 | 2.18 | 2.18 |
| Butanol | Parts | — | 2.00 | 4.00 | 6.00 | 8.00 |
| Mixing ratio, 100 parts of polyol; parts of isocyanate |  | 44.1 | 48.8 | 53.4 | 58.1 | 62.8 |
| Cream time | [sec.] | 13 | 14 | 14 | 14 | 15 |
| Fiber time | [sec.] | 80 | 87 | 90 | 87 | 85 |

TABLE 2-continued

|  |  | 7 (C) | 8 (C) | 9 (C) | 10 (C) | 11 (C) |
|---|---|---|---|---|---|---|
| Rise time | [sec.] | 155 | 130 | 180 | 180 | 200 |
| Density DIN 53 420 | [g/l] | 50.2 | 49.1 | 48.4 | 46.8 | Collapse |
| Elasticity ASTM D-3574-86 | [%] | 61 | 50 | 38 | 31 | — |
| Tensile strength DIN 53 571 | [kPa] | 88 | 113 | 74 | 34 | — |
| Elongation DIN 53 571 | [%] | 208 | 312 | 324 | 157 | — |
| Compressive set DIN 53 572 | [%] | 3.5 | 8 | 26 | 40 | — |
| Indentation resistance B (40%) DIN 53 576 | [N] | 179 | 157 | 123 | 104 | — |
| Fogging DIN 75 201 | [mg] | 0.01 | 0.07 | 0.09 | 0.12 | — |
| Loss factor [1)] DIN 53 426 |  | 0.14 | 0.19 | 0.25 | 0.31 | — |

Index: in all cases 100
[1)]Measured by the vibrometer method

EXAMPLES 12 to 17

Use of isopropylideneglycerol in a foam formulation for producing viscoelastic foams.

Foaming was carried out as described in Examples 1 to 6. The exact amounts used and the properties of the foams are shown in Table 3.

TABLE 3

|  |  | 12 (C) | 13 | 14 | 15 | 16 | 17 |
|---|---|---|---|---|---|---|---|
| Polyol A | Parts | 5.51 | 5.51 | 5.51 | 5.51 | 5.51 | 5.51 |
| Polyol B | Parts | 86.19 | 86.19 | 86.19 | 86.19 | 86.19 | 86.19 |
| Polyol C | Parts | 8.50 | 8.50 | 8.50 | 8.50 | 8.50 | 8.50 |
| Stabilizer 2 | Parts | 2.26 | 2.26 | 2.26 | 2.26 | 2.26 | 2.26 |
| Catalyst 1 | Parts | 0.22 | 0.22 | 0.22 | 0.22 | 0.22 | 0.22 |
| Catalyst 2 | Parts | 0.16 | 0.16 | 0.16 | 0.16 | 0.16 | 0.16 |
| Water | Parts | 3.19 | 3.19 | 3.19 | 3.19 | 3.19 | 3.19 |
| Isopropylideneglycerol | Parts | — | 2.00 | 4.00 | 6.00 | 8.00 | 10.00 |
| Mixing ratio, 100 parts of polyol; parts of isocyanate |  | 65.3 | 67.3 | 69.3 | 71.3 | 73.2 | 75.3 |
| Cream time | [sec.] | 8 | 8 | 9 | 9 | 10 | 10 |
| Fiber time | [sec.] | 50 | 52 | 55 | 57 | 60 | 60 |
| Rise time | [sec.] | 85 | 90 | 95 | 105 | 112 | 123 |
| Density DIN 53 420 | [g/l] | 39.1 | 40.3 | 41.0 | 41.6 | 41.6 | 42.3 |
| Elasticity ASTM D-3574-86 | [%] | 10.5 | 8.9 | 7.3 | 6.4 | 5.8 | 5.7 |
| Tensile strength DIN 53 571 | [kPa] | 51 | 44 | 41 | 39 | 41 | 39 |
| Elonqation DIN 53 571 | [%] | 113 | 118 | 138 | 160 | 175 | 199 |
| Compressive set DIN 53 572 | [%] | 0.8 | 0.9 | 1.1 | 1.8 | 2.2 | 4.0 |
| Indentation resistance B (40%) DIN 53 576 | [N] | 114 | 94 | 75 | 61 | 49 | 38 |
| Fogging DIN 75 201 | [mg] | 0.02 | 0.03 | 0.02 | 0.07 | 0.08 | 0.05 |
| Loss factor [1)] DIN 53 426 |  | 0.99 | 0.88 | 0.98 | 1.12 | 1.23 | 1.36 |

Index: in all experiments 90.

EXAMPLES 18 to 23

Use of isopropylidene-trimethylolpropane in a foam formulation for producing viscoelastic foams.

The procedure was as described in Examples 1 to 6. The exact amounts used and the properties of the foams are shown in Table 4.

TABLE 4

|  |  | 18 (C) | 19 | 20 | 21 | 22 | 23 |
|---|---|---|---|---|---|---|---|
| Polyol A | Parts | 5.51 | 5.51 | 5.51 | 5.51 | 5.51 | 5.51 |
| Polyol B | Parts | 86.19 | 86.19 | 86.19 | 86.19 | 86.19 | 86.19 |
| Polyol C | Parts | 8.50 | 8.50 | 8.50 | 8.50 | 8.50 | 8.50 |
| Stabilizer 2 | Parts | 2.26 | 2.26 | 2.26 | 2.26 | 2.26 | 2.26 |
| Catalyst 1 | Parts | 0.22 | 0.22 | 0.22 | 0.22 | 0.22 | 0.22 |
| Catalyst 2 | Parts | 0.16 | 0.16 | 0.16 | 0.16 | 0.16 | 0.16 |
| Water | Parts | 3.19 | 3.19 | 3.19 | 3.19 | 3.19 | 3.19 |
| Isopropylidene-TMP | Parts | — | 2.00 | 4.00 | 6.00 | 8.00 | 10.00 |
| Mixing ration, 100 parts of polyol; parts of isocyanate |  | 65.3 | 67.0 | 68.6 | 70.2 | 71.8 | 73.3 |
| Cream time | [sec.] | 10 | 12 | 12 | 14 | 15 | 15 |

TABLE 4-continued

|  |  | 18 (C) | 19 | 20 | 21 | 22 | 23 |
|---|---|---|---|---|---|---|---|
| Fiber time | [sec.] | 65 | 72 | 74 | 78 | 84 | 87 |
| Rise time | [sec.] | 85 | 90 | 95 | 100 | 107 | 115 |
| Density DIN 53 420 | [g/l] | 41 | 42.3 | 43.6 | 44 | 44.2 | 44.7 |
| Elasticity ASTM D-3574-86 | [%] | 15.7 | 9.7 | 9.1 | 7.9 | 6.5 | 6.1 |
| Tensile strength DIN 53 571 | [kPa] | 48.4 | 45.1 | 43.9 | 42.3 | 43.9 | 44.2 |
| Elongation DIN 53 571 | [%] | 112 | 128 | 123 | 133 | 147 | 158 |
| Compressive set DIN 53 572 | [%] | 1.8 | 1.1 | 1.3 | 1.2 | 2.2 | 2.1 |
| Indentation resistance B (40%) DIN 53 576 | [N] | 119 | 104 | 87.8 | 79 | 68.1 | 64 |
| Loss factor [1] DIN 53 426 |  |  | 0.77 | 0.86 | 0.93 | 1.02 | 1.12 | 1.17 |

Index: in all experiments 90.

EXAMPLES 24 to 29

Use of cyclohexanol in a foam formulation for producing viscoelastic foams.

The procedure was as described in Examples 1 to 6. The exact amounts used and the properties of the foams are shown in Table 5.

TABLE 5

|  |  | 24 (C) | 25 | 26 | 27 | 28 | 29 |
|---|---|---|---|---|---|---|---|
| Polyol A | Parts | 5.51 | 5.51 | 5.51 | 5.51 | 5.51 | 5.51 |
| Polyol B | Parts | 86.19 | 86.19 | 86.19 | 86.19 | 86.19 | 86.19 |
| Polyol C | Parts | 8.50 | 8.50 | 8.50 | 8.50 | 8.50 | 8.50 |
| Stabilizer 2 | Parts | 2.26 | 2.26 | 2.26 | 2.26 | 2.26 | 2.26 |
| Catalyst 1 | Parts | 0.22 | 0.22 | 0.22 | 0.22 | 0.22 | 0.22 |
| Catalyst 2 | Parts | 0.16 | 0.16 | 0.16 | 0.16 | 0.16 | 0.16 |
| Water | Parts | 3.19 | 3.19 | 3.19 | 3.19 | 3.19 | 3.19 |
| Cyclohexanol | Parts | — | 2.00 | 4.00 | 6.00 | 8.00 | 10.00 |
| Mixing ratio, 100 parts of polyol; parts of isocyanate |  | 65.3 | 67.0 | 68.6 | 70.2 | 71.8 | 73.3 |
| Cream time | [sec.] | 10 | 12 | 12 | 13 | 14 | 15 |
| Fiber time | [sec.] | 66 | 72 | 79 | 74 | 91 | 100 |
| Rise time | [sec.] | 94 | 95 | 101 | 107 | 120 | 129 |
| Density DIN 53 420 | [g/l] | 43.1 | 42.7 | 42.8 | 42.9 | 43 | 44 |
| Elasticity ASTM D-3574-86 | [%] | 13.7 | 13.0 | 8.2 | 6.5 | 5.7 | 5.1 |
| Tensile strength DIN 53 571 | [kPa] | 35.8 | 48.2 | 47.4 | 42.5 | 51.9 | 54.5 |
| Elongation DIN 53 571 | [%] | 63 | 90 | 113 | 123 | 163 | 186 |
| Compressive set DIN 53 572 | [%] | 0.6 | 1.7 | 1.8 | 1.8 | 3.8 | 7.2 |
| Indentation resistance B (40%) DIN 53 576 | [N] | 132 | 98 | 76 | 60 | 46 | 32 |

Index: in all experiments 90.

Examples 30 to 35

Comparison

Use of butanol in a foam formulation for producing viscoelastic foams.

The procedure was as described in Examples 1 to 6. The exact amounts used and the properties of the foams are shown in Table 6.

TABLE 6

|  |  | 30 (C) | 31 (C) | 32 (C) | 33 (C) | 34 (C) | 35 (C) |
|---|---|---|---|---|---|---|---|
| Polyol A | Parts | 5.51 | 5.51 | 5.51 | 5.51 | 5.51 | 5.51 |
| Polyol B | Parts | 86.19 | 86.19 | 86.19 | 86.19 | 86.19 | 86.19 |
| Polyol C | Parts | 8.50 | 8.50 | 8.50 | 8.50 | 8.50 | 8.50 |
| Stabilizer 2 | Parts | 2.26 | 2.26 | 2.26 | 2.26 | 2.26 | 2.26 |
| Catalyst 1 | Parts | 0.22 | 0.22 | 0.22 | 0.22 | 0.22 | 0.22 |
| Catalyst 2 | Parts | 0.16 | 0.16 | 0.16 | 0.16 | 0.16 | 0.16 |
| Water | Parts | 3.19 | 3.19 | 3.19 | 3.19 | 3.19 | 3.19 |
| Butanol | Parts |  | 2.00 | 4.00 | 6.00 | 8.00 | 10.00 |
| Mixing ratio, 100 parts of polyol; parts of isocyanate |  | 65.3 | 69.4 | 73.5 | 77.6 | 81.7 | 85.8 |
| Cream time | [sec.] | 10 | 10 | 11 | 12 | 13 | 13 |
| Fiber time | [sec.] | 58 | 65 | 71 | 77 | 87 | 100 |
| Rise time | [sec.] | 78 | 85 | 96 | 105 | 120 | 145 |

TABLE 6-continued

|  |  | 30 (C) | 31 (C) | 32 (C) | 33 (C) | 34 (C) | 35 (C) |
|---|---|---|---|---|---|---|---|
| Density DIN 53 420 | [g/l] | 40.9 | 41 | 41 | 41.7 | 43.8 | Collapse |
| Elasticity ASTM D-3574-86 | [%] | 11.9 | 7.9 | 5.9 | 5.3 | 4.5 | Collapse |
| Tensile strength DIN 53 571 | [kPa] | 48 | 35 | 29 | 22 | 1) | Collapse |
| Elongation DIN 53 571 | [%] | 95 | 117 | 141 | 167 | 1) | Collapse |
| Compressive set DIN 53 572 | [%] | 1.1 | 1.5 | 1.9 | 2.6 | 3.6 | Collapse |
| Indentation resistance B (40%) DIN 53 576 | [N] | 111 | 70 | 44 | 27 | 21 | Collapse |

Index: in all experiments 90.
1) Owing to the softness of the foam, no foam specimens could be taken.

Conclusions

The compounds according to the present invention increase the fiber time and rise time and significantly improve the flowability of the still-liquid mixture during the polyaddition. In the industrial production of molded foams, this means that complex/complicated mold geometries as are quite usual in the automobile industry, for example for the manufacture of automobile seats or backrests, can be filled with the polyurethane without problems and the number of reject flexible foam components in production can thereby be significantly reduced.

A further important criterion for judging plastics is the fogging behavior. Volatile constituents of the formulation are determined quantitatively by the measurement method of DIN 75 201. This method is nowadays part of almost all automobile manufacturer's specifications. The quantitative incorporation of the cyclic or heterocyclic compounds according to the present invention is underlined or confirmed by measurement of the fogging behavior. An increasing amount of the additive in the formulation is found to produce only an insignificant increase in the amount of fogging condensate. The loss factor, determined as a measure of the viscoelastic properties, is doubled both by addition of the products according to the present invention and also by addition of 1-butanol, but foams which have been produced using more than 6% of 1-butanol are no longer dimensionally stable and cure fully only after a very long time.

Examples 36 to 42

Isopropylideneglycerol in a TDI formulation for producing viscoelastic foams.

The procedure was as described in Examples 1 to 6, using TDI 80/20 as isocyanate component. The exact amounts used and the properties of the foams are shown in Table 7.

TABLE 7

|  |  | 36 | 37 | 38 | 39 | 40 | 41 | 42 |
|---|---|---|---|---|---|---|---|---|
| Polyol B | Parts | 75.00 | 75.00 | 75.00 | 75.00 | 75.00 | 75.00 | 75.00 |
| Polyol C | Parts | 20.80 | 20.80 | 20.80 | 20.80 | 20.80 | 20.80 | 20.80 |
| Stabilizer 2 | Parts | 1.00 | 1.00 | 1.00 | 1.00 | 1.00 | 1.00 | 1.00 |
| Catalyst 1 | Parts | 0.27 | 0.27 | 0.27 | 0.27 | 0.27 | 0.27 | 0.27 |
| Catalyst 2 | Parts | 0.06 | 0.06 | 0.06 | 0.06 | 0.06 | 0.06 | 0.06 |
| Water | Parts | 1.60 | 1.60 | 1.60 | 1.60 | 1.60 | 1.60 | 1.60 |
| IP-Glycerol | Parts | 0 | 1 | 2 | 3 | 4 | 5 | 6 |
| Mixing ratio, 100 parts of polyol; parts of isocyanate |  | 32.7 | 33.4 | 34 | 34.7 | 35.4 | 36.0 | 36.7 |
| Cream time | [sec.] | 8 | 10 | 9 | 10 | 10 | 10 | 10 |
| Fiber time | [sec.] | 64 | 68 | 70 | 74 | 72 | 75 | 78 |
| Rise time | [sec.] | 210 | 180 | 150 | 155 | 155 | 148 | 145 |
| Density DIN 53 420 | [g/l] | 1) | 52.6 | 55.4 | 55.5 | 56.8 | 58.3 | 62.1 |
| Elasticity ASTM D-3574-86 | [%] | 1) | 28.2 | 24.2 | 19.1 | 14.5 | 8.7 | 8.1 |
| Tensile strength DIN 53 571 | [kPa] | 1) | 26 | 2) | 2) | 2) | 2) | 2) |
| Elongation DIN 53 571 | [%] | 1) | 112 | 2) | 2) | 2) | 2) | 2) |
| Compressive set DIN 53 572 | [%] | 1) | 4.2 | 4.2 | 5.0 | 7.1 | 5.5 | 8.9 |
| Indentation resistance B (40%) DIN 53 576 | [N] | 1) | 102 | 94.3 | 88.4 | 76.8 | 68.7 | 67.5 |

Index: in all experiments 90.
Notes:
1) The foam from Experiment 36, without additive, displayed significant shrinkage, which is why no test specimens could be taken.
2) Tensile strength and elongation of the foams 38–42 could not be measured because test specimens could not be sawn out owing to the low rigidity of the foams.

Isopropylideneglycerol significantly improves the open cell content which is necessary in the block foams and thus prevents a loss in dimensional stability.

The decrease in elasticity of the foams with increasing amount of isopropylideneglycerol makes it clear that the desired damping properties are improved.

We claim:

1. A method for producing flexible polyurethane foams comprising:
   reacting at least one polyisocyanate with a compound containing at least two isocyanate-reactive hydrogen atoms in the presence of a cyclic or heterocyclic compound containing at least one isocyanate-reactive hydrogen atom, wherein the cyclic or heterocyclic compound is selected from the group consisting of aromatic mono-alcohols, imidazoles, oxazolines, oxazolidines, morpholines, pyrrolidinones, cyclic acetals, and cyclic ketals.

2. The method as recited in claim 1, comprising reacting the at least one polyisocyanate with a compound containing at least two isocyanate-reactive hydrogen atoms in the presence of a cyclic or heterocyclic compound containing at least one isocyanate-reactive hydrogen atom, wherein the cyclic or heterocyclic compound contains a hydroxyl group.

3. The method as recited in claim 1, comprising providing the cyclic or heterocyclic compound containing at least one isocyanate-reactive hydrogen atom in an amount of from 0.5 to 10.0 percent by weight based on the total weight of the compound containing at least two isocyanate-reactive hydrogen atoms.

4. The method as recited in claim 1, comprising reacting the at least one polyisocyanate with a compound containing at least two isocyanate-reactive hydrogen atoms in the presence of a cyclic or heterocyclic compound containing at least one isocyanate-reactive hydrogen atom, wherein the cyclic or heterocyclic compound contains a polyether chain having at least one hydroxyl group.

5. The method as recited in claim 1, comprising reacting the at least one polyisocyanate with a compound containing at least two isocyanate-reactive hydrogen atoms in the presence of a cyclic or heterocyclic compound containing at least one isocyanate-reactive hydrogen atom, wherein the cyclic or heterocyclic compound comprises the reaction products of glycerol and/or trimethylolpropane with aldehydes and/or ketones having from 1 to 12 carbon atoms in the main chain.

6. The method as recited in claim 1, further comprising forming a highly elastic or viscoelastic flexible polyurethane foam.

7. The method as recited in claim 1, further comprising reacting the at least one polyisocyanate with the compound containing at least two isocyanate-reactive hydrogen atoms in the presence of the cyclic or heterocyclic compound containing at least one isocyanate-reactive hydrogen atom and a blowing agent.

8. A flexible polyurethane foam produced according to the process of claim 1.

9. The flexible polyurethane foam of claim 8, wherein elasticity of said foam is lower than elasticity of foam made in the absence of said cyclic or heterocyclic compounds.

10. The flexible polyurethane foam of claim 8, wherein loss properties of said foam are higher than loss properties of foam made in the absence of said cyclic or heterocyclic compounds.

11. The flexible polyurethane foam of claim 8, having improved liquid system flowability during foaming based upon longer rise time than foam made in the absence of said cyclic or heterocyclic compounds.

12. A flexible viscoelastic polyurethane foam comprising the reaction product of at least one polyisocyanate with a compound containing at least two isocyanate-reactive hydrogen atoms and a cyclic or heterocyclic compound containing at least one isocyanate-reactive hydrogen atom, said cyclic or heterocyclic compound selected from the group consisting of aromatic mono-alcohols, imidazoles, oxazolines, oxazolidines, morpholines, pyrrolidionones, cyclic acetals, and cyclic ketals incorporated into the foam structure.

13. The flexible polyurethane foam of claim 12, wherein elasticity of said foam is lower than elasticity of foam made in the absence of said cyclic or heterocyclic compounds.

14. The flexible polyurethane foam of claim 12, wherein loss properties of said foam are higher than loss properties of foam made in the absence of said cyclic or heterocyclic compounds.

15. The flexible polyurethane foam of claim 12, having improved liquid system flowability during foaming based upon longer rise time than foam made in the absence of said cyclic or heterocyclic compounds.

* * * * *